United States Patent [19]

Gostomski

[11] 4,068,886

[45] Jan. 17, 1978

[54] TELESCOPIC COVER ASSEMBLY FOR OPEN BED VEHICLES

[76] Inventor: Richard B. Gostomski, 636 Sixth St., Owen, Wis. 54460

[21] Appl. No.: 736,647

[22] Filed: Oct. 28, 1976

[51] Int. Cl.² .............................................. B60J 7/10
[52] U.S. Cl. ................................................ 296/137 B
[58] Field of Search .............. 296/137 B, 100; 49/254

[56] References Cited

U.S. PATENT DOCUMENTS

| 2,853,340 | 9/1958 | Hershberger ..................... 296/137 B |
| 3,165,352 | 1/1965 | Hallock .................................... 296/100 |
| 3,342,523 | 9/1967 | Lutgen .................................... 296/100 |
| 3,578,378 | 5/1971 | Anderson ......................... 296/137 B |
| 3,640,565 | 2/1972 | Anderson ......................... 296/137 B |

*Primary Examiner*—Robert R. Song
*Attorney, Agent, or Firm*—Henderson, Strom & Sturm

[57] ABSTRACT

A telescoping cover assembly for the open bed of a vehicle comprising front and rear cover sections movable relative to each other is disclosed. The assembly provides a versatile enclosure which permits selective access to all areas of the vehicle bed without the burden of removing the cover. Furthermore, this structure is sectionally removable, or tiltable to a vertical telescoped position which allows ready use of the open bed for large cargo transport. The sections are lockable in various positions to insure safety and security.

8 Claims, 13 Drawing Figures

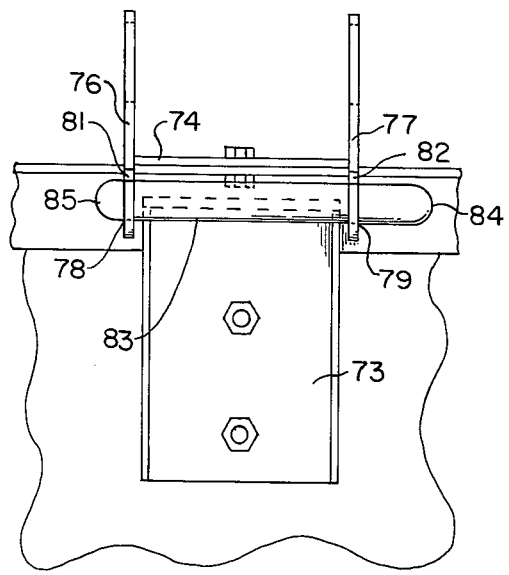
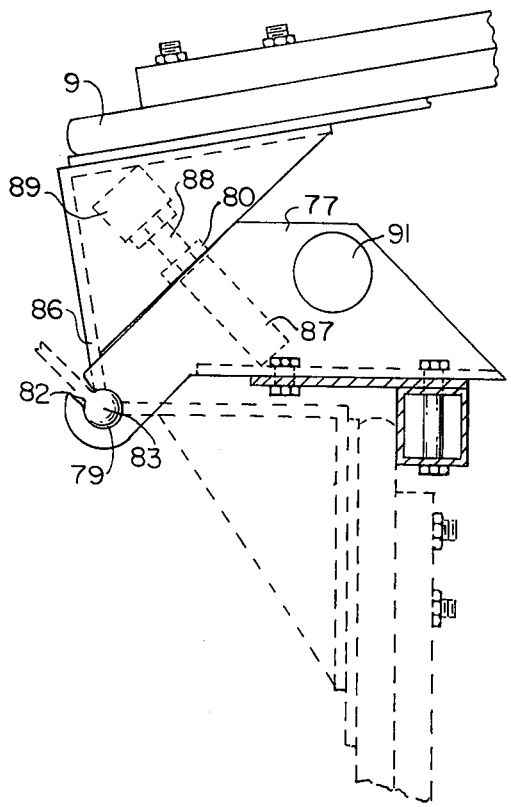
FIG. 11
FIG. 12

TELESCOPIC COVER ASSEMBLY FOR OPEN BED VEHICLES

BACKGROUND OF THE INVENTION

This invention relates generally to covers for open bed vehicles, and specifically to a telescoping cover assembly for open bed vehicles.

The last few years have seen a marked increase in consumer interest in recreation vehicles of all designs, including self-powered campers, trailers and "toppers" which fit on the open bed of a vehicle such as a pickup truck. It is this latter category which seemingly enjoys the most activity, due to the versatility they add to pickup trucks already owned by individuals such as contractors, farmers, constructors, and sportsman.

The most common type of pickup cover is that which is of one piece construction and is removably affixed to the walls of the truck bed. To remove these devices, one must either employ a system of jacks or enlist the assistance of several good sized men. These one piece structures offer limited versatility in that they may be used only as a camper and as a means for storage; however, large cargo items cannot be loaded into the truck bed without completely removing the topper itself. Also, these one piece devices do not offer ready access to all portions of the truck bed; i.e., the only way to reach items stored in the front of the bed is to go in through the tail gate area.

Several movable open bed covers, including telescopic covers, are known in the prior art. Attention is directed to the following U.S. patents which disclose bed covers which are either movable or pivotable to expose the bed area; U.S. Pat. Nos. 3,768,858; 3,762,762; 3,765,716 and 3,785,698. Telescopic covers, more related to the instant invention, are shown and described in U.S. Pat. Nos. 3,165,352; 3,762,763; 3,640,565, and 3,578,379. While the patents mentioned above represent a type of cover available to the trade, none possess the improved cover sections, guides, mountings, and tail gate structures disclosed herein, nor the improved construction by which the cover sections may be pivoted either individually or as a unit away from the open bed to provide unrestricted access to the bed.

SUMMARY OF THE INVENTION

It is an object of this invention to provide a rigid cover for an open bed vehicle that provides protection for cargo and people from the elements.

It is an object of this invention to provide a rigid cover for an open bed vehicle that provides protection against unwarranted entry.

It is another object of this invention to provide a telescoping cover assembly that allows easy outside access to all portions of the vehicle bed.

It is another object of this invention to provide a telescoping cover assembly which may easily be repositioned to allow unlimited cargo height and over 90% bed length usage.

It is another object of this invention to provide a multi-sectional cover assembly which is extremely easy to remove and install.

It is another object of this invention to provide a telescoping cover assembly which may be removed and installed without the use of tools.

It is a still further object of this invention to provide a telescoping cover assembly which has selectable locking positons to insure safety.

It is another object of this invention to provide a unique tail gate hinge which permits the removal of the gate without the use of tools.

It is a still further object of this invention to provide a unique tail gate hinge structure which permits the tail gate to be pivoted through an arc of approximtely 270°.

It is an even still further object of this invention to provide a unique section locking structure which enhances the ease of the overall assembly operation.

It is an even still further object of this invention to provide a unique locking structure which is easy to install and operate.

A further object of this invention is to provide a unique roller track design which permits the cover sections to be easily removed or pivoted to a position which leaves the vehicle bed substantially unobstructed.

It is another object of this invention to provide a unique utility rack on multiple cover sections which permits access to the vehicle bed without the necessity of removing objects on the utility rack.

A further object of this invention is to provide a cover for an open bed vehicle that is easy to manufacture, rugged in use and inexpensive in operation.

The above and other objects are accomplished according to the invention providing a telescoping cover assembly for the open bed of a vehicle comprising front and rear cover sections movable relative to each other. The assembly provides a versatile enclosure which permits selective access to all areas of the vehicle bed without the burden of rmoving the cover. Furthermore, the structure is sectionally removable, or tiltable to a vertical telescoped position which allows ready use of the open bed for large cargo transport. The sections are lockable in various positions to insure safety and security.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 11 is a front plan view of tail gate hinge assembly; and

FIG. 12 is a partially schematic, partially cross sectional side view of the tail gate hinge assembly.

DESCRIPTION OF THE PREFERRED EMBODIMENTS

The following detailed description is directed to a cover assembly having novel characteristics which provide a versatility heretofore unknown in the prior art. The cover assembly provides a complete access to the vehicle bed by a unique arrangement which allows easy opening of both the front and the rear thereof. The sectional construction and unique track and roller assembly provide a cover which is easily removed or tilted to allow the transportation of bulky cargo items.

Figure 1:
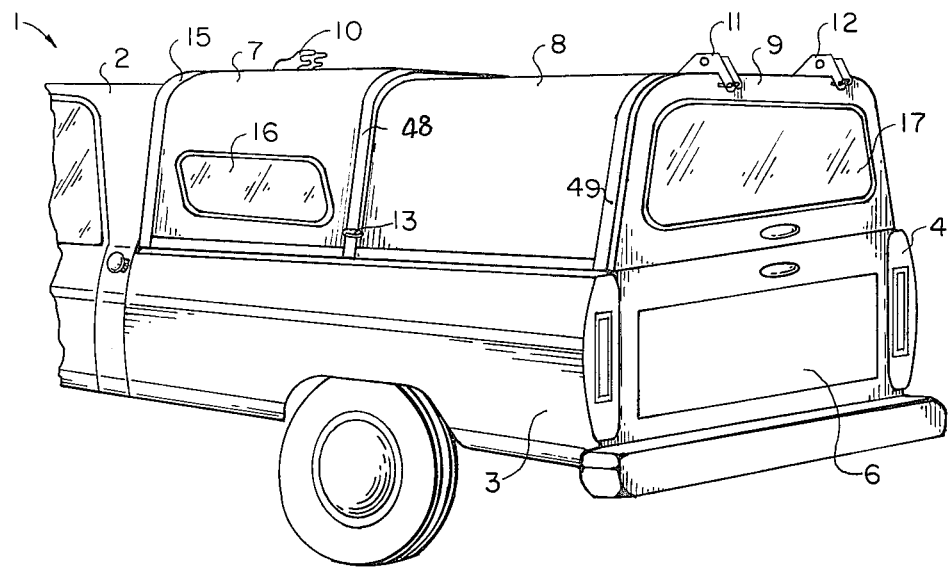
FIG. 1 is a partially schematic perspective view of the cover assembly of the instant invention installed on the bed of a pickup truck.
Figure 2:
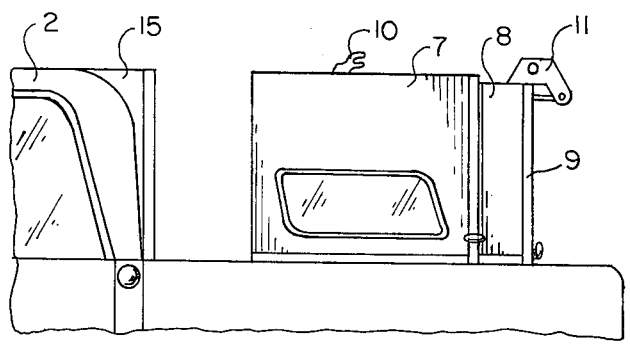
FIG. 2 is a side plan view of the cover showing both sections thereof moved toward the center of the truck bed.
Figure 3:
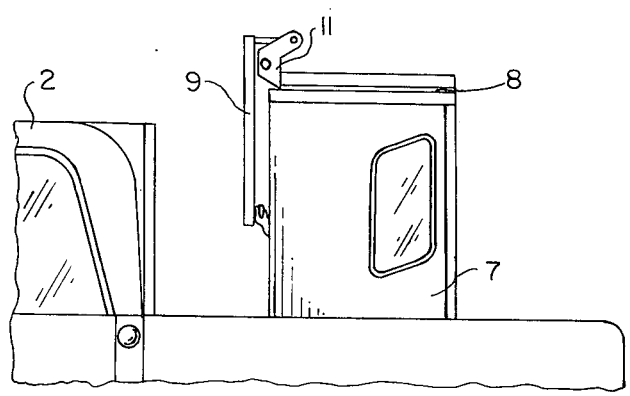
FIG. 3 is a side plan view showing the cover assembly in its fully telescoped, pivoted position on the front of the truck bed.
Figure 4:
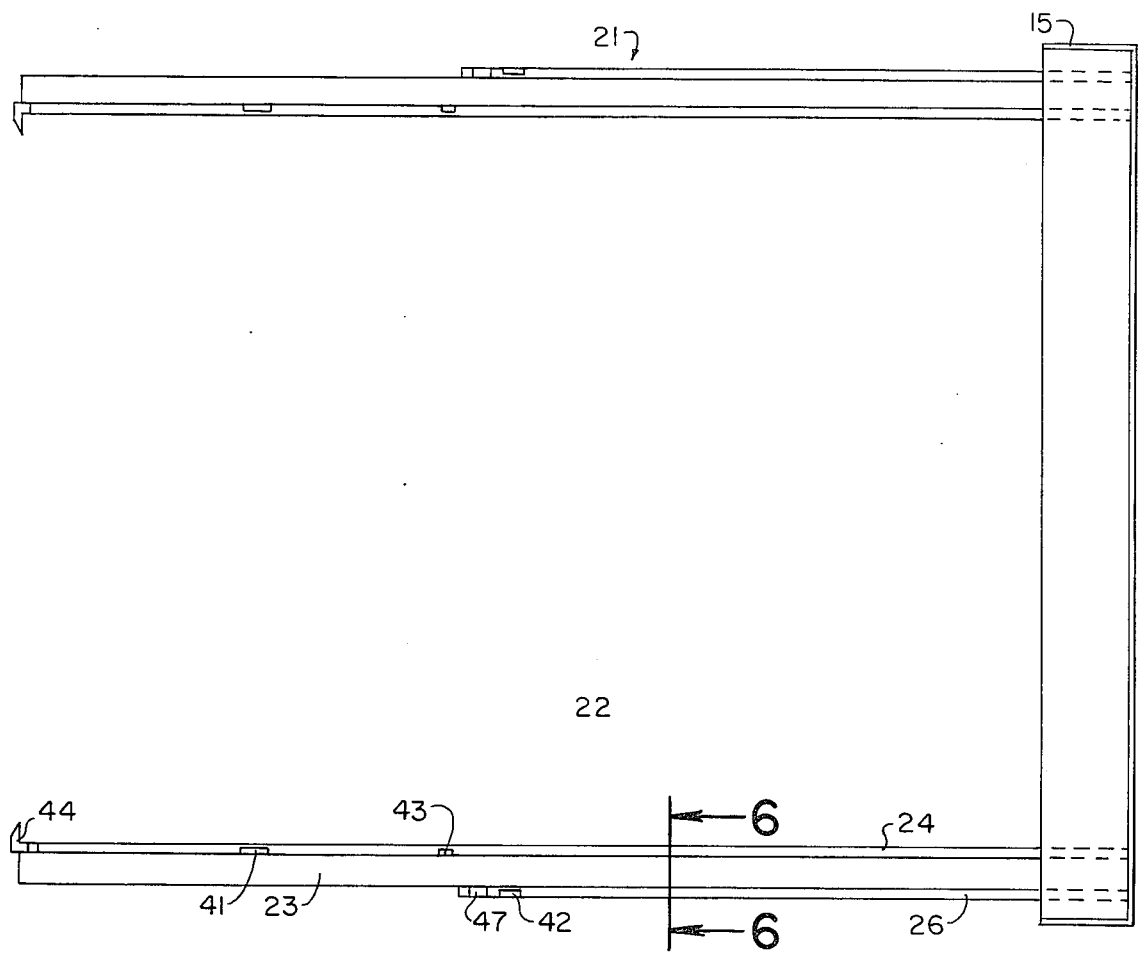
FIG. 4 is a top plan view of the track assembly as it would be positioned on the top of the truck side portions.
Figure 5:
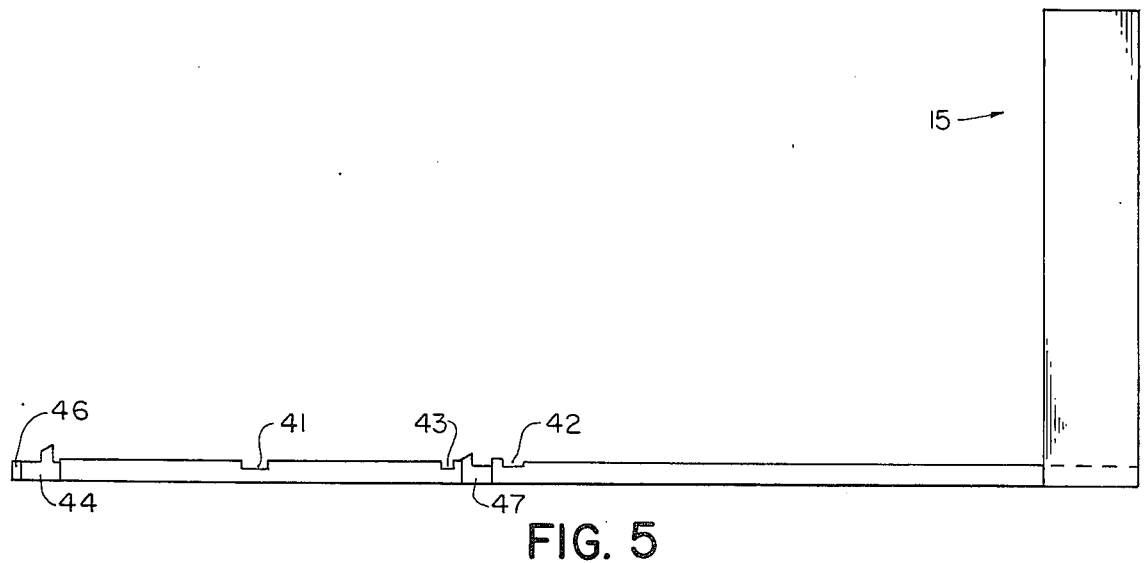
FIG. 5 is a side plan view of the track assembly of FIG. 4.
Figure 6:
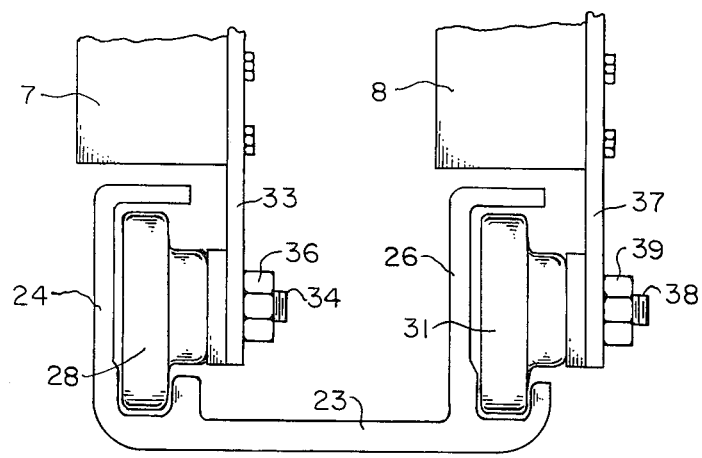
FIG. 6 is a partially schematic, partially cross sectional view taken along line 6—6 of FIG. 4, showing the track section and rollers mounted therein.

Referring now to FIGS. 1 through 3, there is shown with the general designation 1, a cover assembly according to the instant invention affixed to the open bed of a common pickup truck. The bed of the vehicle is defined forwardly by the cab section 2, the side sections 2 and 4 and the rear tailgate 6. Cover assembly 1 is comprised primarily of a forward bulkhead 15 which is affixed to the cab section 2 and sealingly engages forward cover section 7 which in turn sealingly engages in a telescoping manner rearward cover section 8. Tailgate 9 is affixed to rear cover section 8 by a pair of hinges 11 and 12 and locked in position by a lock mechanism generally designated 14. Each of the cover sections 7 and 8 further include a locking mechanism, only one of which, 13, can be seen in these figures. These locking mechanisms will be described in further detail below. Cover section 7 further includes a holding mechanism 10 on the top thereof which, under certain circumstances to be described below, will holdingly engage the handle 14 on tail gate 9. It should be readily apparent that any desired trim or window arrangements can be incorporated in the apparatus without affecting or interferring with the operation of the general assembly. For example, side windows such as 16 may be added in either or all of the cover sections or a window 17 in the tail gate may prove advantageous.

FIG. 2 shows the versatility of movement of the cover sections 7 and 8. Cover section 7 has been moved rearwardly to expose the forward portion of the truck bed and allow a complete access to that area. Rear cover section 8 has been moved slightly forward to allow a more complete access to the rear portion of the truck bed. It should be realized that this figure merely shows that the two cover sections may be moved relative to each other, and that the amount or distance of movement shown is not necessarily a limitation. For instance, if section 7 were in its foremost position, section 8 could be telescoped substantially completely within section 7 to allow access to at least one half of the bed of the vehicle. Obviously, this is a distinct advantage when it is desired to transport cargo which is higher than the top portion of the cover sections.

In FIG. 3, the rear cover section 8 has been telescoped into forward cover section 7 and the two have been substantially smultaneously pivoted through an angle of approximately 90°. The tail gate is shown to have been opened fully and the handle 14 engaged with the holding device 10 on cover section 7. In this position, the cover assembly is fairly rigid, but it would be well within the scope of this invention to add a holding device of some type to insure that the two cover sections remained in the upright position during travel. By positioning the cover sections as shown in this figure, or, more accurately, with the upright sections moved close to cab 2, at least 90% of the length of the truck bed is available for the transportation of cargo. Additionally, a repositioning such as shown allows unlimited cargo height transportion. Obviously, this is very advantageous inasmuch as one may reposition the cover assembly and carry large bulky cargo items without completely removing the cover assembly.

Figure 7:
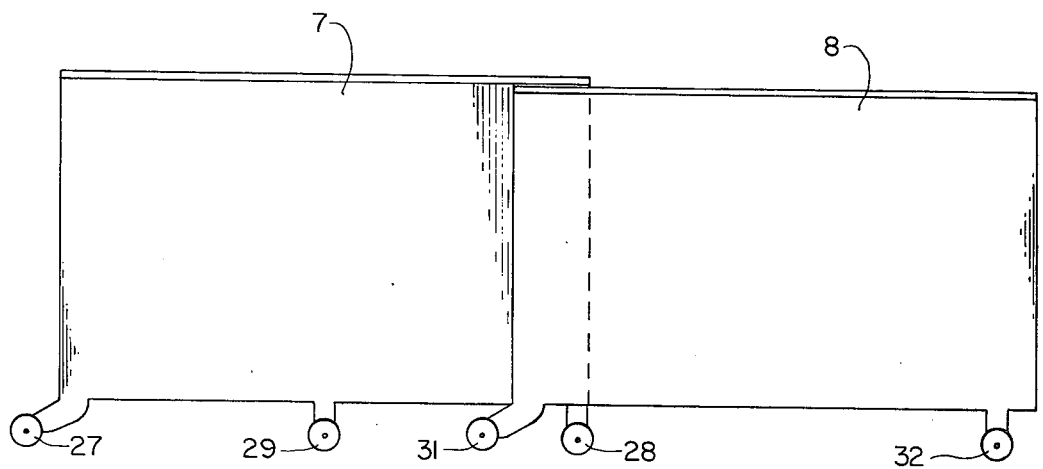
FIG. 7 is a partially schematic, cross sectional view of the cover assemblies taken from the inside thereof looking out.

Referring now to FIGS. 4 through 7, the novel roller and track assembly arrangement will be described. A pair of tracks 21 and 22 are, respectively, affixed to the tops of bed side walls 3 and 4. Since the tracks are identical to each other, only track 22 wil be described in detail. An elongate substantially flat plate member 23 is affixed to the top of side member 4, by conventional means not shown, and extends substantially from the front thereof near cab 2 to the rear thereof. Best seen in FIG. 6, the plate member 23 has affixed thereto, or integral therewith, roller retainers 24 and 26. Walls of the roller retainers are such that they close the rollers and prevent them from escaping, while at the same time allowing free movement thereof along the track within the retainer. Retainer 24 extends substantially the same length as the plate 23; however, roller retainer 26 is substantially shorter and extends approximately one half the length of the side of the truck bed. As best seen in FIG. 7, each of the cover sections 7 and 8 include a plurality of rollers affixed to the bottom thereof in a cantilevered fashion. This figure is a longitudinal cross section through the cover sections and only shows one side thereof, or, in other words, each of the rollers shown in this figure is represented by a pair of rollers one on each side of the cover sections. Front cover section 7 includes three rollers, a forward roller 7, a rear roller 28 and a middle roller 29. Rear cover section 8 includes a forward roller 31 and a rear roller 32.

Cross sectional view 6 has had rollers 28 and 31 added thereto to better show the telescoping relationship between the cover sections. It can be seen that roller 28 is affixed to cover 7 by a cantilevered bar 33 and a nut and bolt arrangement 34 and 36. Likewise, cover section 8 is affixed to roller 31 by bar 37 and nut and bolts 38 and 39. Now, referring again to FIGS. 4 and 5, the roller retainer 24 includes a notch 41 through which the rollers on cover section 8 may be easily lifted for either removal of the cover section or tilting thereof relative to the track. Likewise, roller retainer 26 includes a roller release slot 42 for the removal of the rollers on cover section 7. There is shown in this figure a notch 43 in the roller retainer 24 into which a latch bolt fits to lock cover section 8 in position. The relationship between this notch and the latch bolt will be described in detail below.

Furthermore, there is shown on the rear end of the roller retainer 24, a latch 44 into which the latch bolts on the tail gate are selectively engaged. Latch bolt 44 further includes an upwardly extending locking service 46 into which the lock bolts on the cover section 8 fit for selective fixing of the cover section in the fully extended position.

At the rearmost end of roller retainer 26 is another latch 47 which serves to fix the forwrd cover section 7 and also as a stop to prevent the rollers in cover section 7 from leaving the retainer 26.

As previously stated, each of the cover sections includes a selective locking mechanism to fixedly locate the sections in desirable positions relative to each other. The lock 13 on forward cover section 7 fixes that section in its full forward position by engaging latch 47. A latch mechanism is also included in cover section 8 in conduit 49, to be described further below, and selectively locks this section in either the full rearward position by engagement with latch 46, or in an open position by engagement with latch 43. Any suitable locking mechanism may be used, but that to be described immediately below has been found particularly advantageous.

Figure 8:
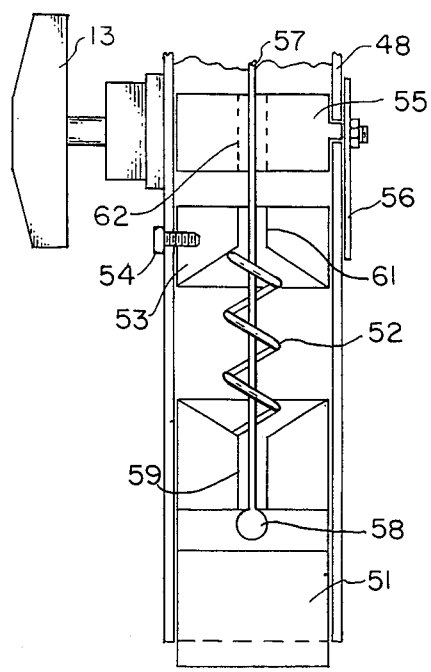
FIG. 8 is a partially schematic, cross sectional view of the latch assembly showing the relationship between the latch block and the operating handle.
Figure 9:
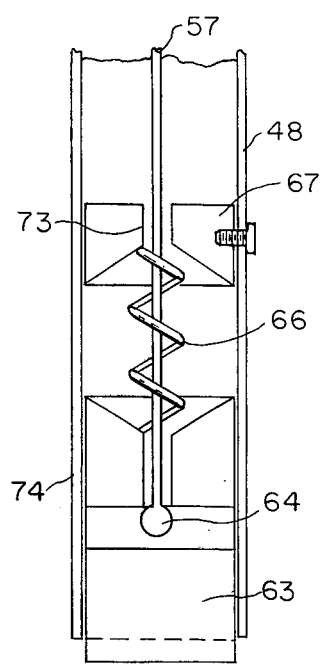
FIG. 9 is a partially schematic, cross sectional view of the latch assembly remote from the assembly shown in FIG. 8.
Figure 10:
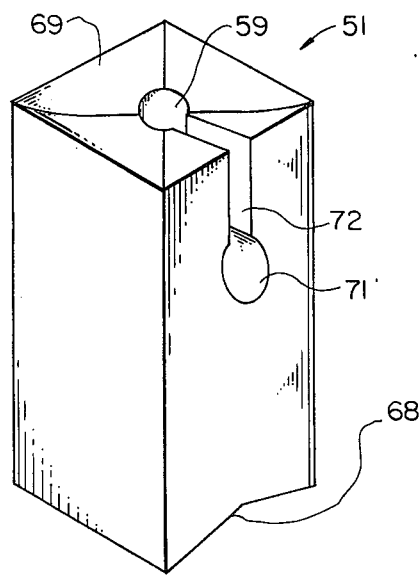
FIG. 10 is a perspective view of the latch block shown in FIGS. 8 and 9.

Referring now to FIGS. 8 through 10, the mechanism for locking forward section 7 will be described. End support member 48, FIG. 1, is a generally U-shaped piece of square tubing securely affixed to the rearward end of cover section 7. The ends of the tubing are directed generally downward and contain the locking mechanisms depicted in these figures. The particular arrangement shown is to an outside actuator on one side, FIG. 8, and no actuator on the other, FIG. 9. Of course, this could be reversed, or for added convenience, both sides could have an outside actuator. The frame 48 is open at the end thereof to receive a latch bolt 51 which is biased by spring 52 in a downward, or locking direction for engagement with the latches on the track assembly. Compression block 53 is fixed within tube 48 by a bolt 54. Exterior latch actuating handle 13, hich may be of the key lock type is fixed to trip shaft 55 and inside latch actuator 56, so that rotation of either actuator causes rotation of the trip shaft. Latch bolt cable 57 has an enlarged end portion 58 and extends through hole 59 in latch bolt 51, hole 61 in compression block 53, hole 62 in trip shaft 55, then through tube 48 to the latch mechanism on the other side, shown in FIG. 9. The enlarged end portion 58 of the cable 57 is larger than the opening of hole 59 and holds the cable fast relative thereto.

The opposite end of tube 48 is substantially like that shown in FIG. 8, but without the actuator mechanism. Latch block 63 holds an enlarged end 64 of cable 57 against the tension of spring 66 acting against fixed compression block 67.

By rotating either actuator 13 or 56, the cable 57 is partially wrapped around tripped shaft 55, and the length thereof effectively shortened. Thus, the latch bolts 51 and 63 are pulled up into the tube 48 and disengaged with the latches on track assemblies 21 and 22. The novel latch bolt used is shown in FIG. 10. Bolt 51 has a latch engaging surface 68 on one end thereof and a depression on the other end thereof 69, for holding a spring, such as 52, in a stable attitude. Horizontal opening 71 and slot 72 allow, as will be seen below, cable 57 and enlarged end portion 58 to be easily positioned therein.

A novel design feature of the locking apparatus just described is that it may be easily and readily assembled within tube 48 without the need for special tools. Firstly, the exact length necessary for cable 57 is determined and the enlarged end portions 58 and 64 are fabricated thereon. These may be made by the tying of a knot or with the affixment of an end capping of some type. Then, one end, say 64, of the cable is fed into tubing 48, through hole 61 in block 53 through hole 62 in trip shaft 55, through tube 48 and through hole 73 in compression block 67. A spring 52 is then placed over end 58 of the cable and then latch bolt 51 is affixed by inserting cable 57 and end portion 58 through hole 71 and slot 72 of bolt 51. A spring 66 is then inserted over cable end 64 and end 64 is forced out through opening 72 in tube 48 and held out until latch bolt 63 is slipped into the bottom of tube 48 until hole 71 in latch bolt 63 aligns with hole 74 in tube 48. Finally, cable end 64 is easily slipped into the hole 59 through slot 72 and hole 71.

In like manner, there is a locking mechanism located within frame tube 49, see FIG. 1, at the rearmost end of cover section 8, to selectively fix that section on track assemblies 21 and 22. To promote the telescoping feature and the tilting operation, there is no exterior actuator on cover section 8, but rather only an interior actuator which can be reached through tail gate 9. The only functional or structural difference between the two locking mechanisms is that the latch bolt engaging surfaces 68 face different directions to allow proper slide action engagement with latches 44 and 47.

The tail gate 9 includes a horizontally disposed locking mechanism which is also constructed according to the description given above. For convenience, both an exterior actuator 14 and an interior actuator, not shown, may be provided.

FIGS. 11 and 12 show a unique hinge design which allows tail gate 9 to be selectively removed without the use of any tools whatsoever. FIGS. 11 and 12 are views of hinge 12, but it should be realized that the two hinges are exactly alike, only mirror images of each other. The hinge comprises two primary elements, a male bracket 73 affixed to tail gate 9, and a female bracket 74 affixed to the top of cover section 8.

The hinge is designed to raise tail gate 9 to a nearly horizontal open position above cover sections 7 and 8, and to engage actuator handle 14 with bracket 10 when in the full telescoped position.

The female bracket 74 includes a pair of arms 76 and 77 which extend rearwardly beyond the end of cover section 8. Each arm has a hole 78 and 79, respectively, and a slot 81 and 82, respectively, therethrough which mate with the male bracket in a very unique manner. The male bracket 73 includes a horizontally disposed pin 83, the outside end of which 84 extends approximately twice as far as the inside end 85. The pin 83 is supported away from the surface of tail gate 9 by a bracket arm 86 which is cantilevered at least a distance equal to the length of the slots 81 and 82, and the tail gate hinges about the bearing surface between pin 83 and the holes 78 and 79 in female bracket 74.

The tail gate is easily installed by placing the outside of either pin part way in its respective bracket hole, and then the inside end of the opposite pin may be easily lined up with the opposite bracket hole, and the tail gate rotated upward until bracket arms 86 align with slots 81 and 82 and the entire tail gate assembly moves into proper horizontal position.

For convenience, either or both hinges may further include an adjustable stop 80 which comprises a support member 87 affixed to the hinge bracket 74, a threaded bolt 88, threadingly engaged with said support member, resilient impact member 89 affixed to the end of bolt 88 and a pair of lock nuts 89 and 91 threaded on said bolt for locking the impact member in selected position. With this apparatus, the arc through which the tail gate swings may be easily and quickly adjusted.

The important tilting feature of the instant invention has been mentioned above, but is worthy of more detailed consideration. In view of the structure and arrangement of elements shown and described above, the operational steps are very easily and readily performed by one person. Firstly, cover section 7 is moved rearwardly until rollers 29 are directly under release slots 42. Secondly, cover section 8 is moved forwardly until actuator 14 of tail gate 9 slips into bracket 10. This will position rollers 32 directly under release slots 41. Finally, the rearmost ends of cover sections 7 and 8 are lifted through a 90° arc while pivoting each about their front rollers 27 and 31, which are held on track by the roller retainers. Alternatively, either cover section could be tilted up separately with the tail gate closed. The cover sections are separately removed in this same sequence, but further including the step of aligning the rear rollers with the release slots.

Figure 13:
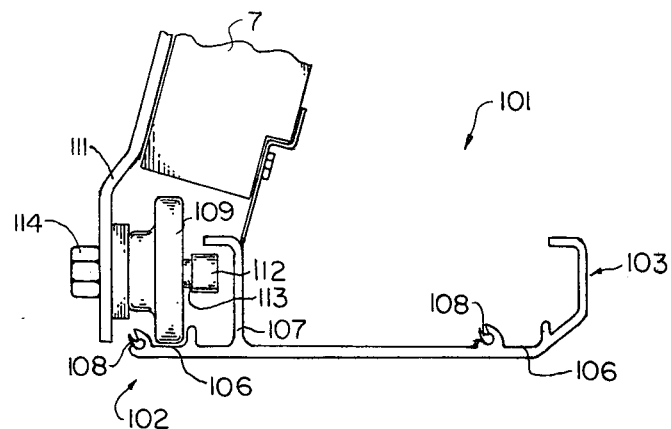
FIG. 13 is a cross sectional view of a modified version of the tract and roller arrangement.

A modified version of the track and roller arrangement is shown in cross section in FIG. 13. The track 101 comprises two roller guide sections 102 and 103 which, at least for that portion of the side rail where they are adjacent, are joined by a plate 104. Obviously, the arrangement shown here is of a unitary, or extruded track. As in the previously described embodiment, the outside track 102 extends substantially one half the length of the truck bed, and the inside track 103 is full length. Each track is substantially identical to the other and includes a roller slot 106 and an adjacent retainer 107. Additionally, elongate flexible dust seals can be provided, as at 108, to prevent moisture and dirt particles from entering the enclosed area.

The main roller 109 is supported in a cantilevered fashion below the cover section 7 in this figure, by an arm 111 affixed thereto. Arm 111 may be covered by a piece of trim in any convenient manner. A secondary roller 112 extends inwardly from main roller 109 and is held in position by a common axel 113 which projects through both rollers and arm 111 and is fastened by nut 114. The secondary roller, and thus the cover sections, is held in vertical position by roller retainer 107 which contains the previously described slots for removal of the sections. This particular embodiment does not permit the main roller 109 to make contact with the track in any place other than the bottom of the track, thereby forcing the roller to rotate rather than slide. The double roller arrangement is particularly advantageous in that the main and secondary rollers can rotate in opposite directions and thus virtually eliminate binding and track damage during the tilting steps.

In summary, there has been described a unique cover assembly for open bed vehicles. The cover assembly is slidable along a track to allow ready access to all portions of the bed, and uniquely rotatable on the track to provide over 90° bed length usage and 100% height usage for the transport of large bulky cargo items.

It will be understood that various other changes of the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

For example, it may prove desirable to add a utility rack to the top of the cover sections for the transport of long bulky items such as ladders or boats. This can readily be accomplished by inserting a bar or rod through the holes 91 in the female brackets 74 of hinges 11 and 12. Additionally, a bracket will have to be added to the front portion of the assembly, as, for example, on section 15. Such forward bracket would be similar to the hinge bracket in width and affixed to section 15. Obviously the brackets would have to be high enough to provide a clearance above bracket 10.

Also, for example, the cover sections have been shown to be substantially vertical in the side view; however, even though not preferred, it may be desirable for asthetics to slant the ends to provide a more streamlined appearance.

I claim:

1. Apparatus for covering in a substantially weather-tight sealing configuration the open bed of a vehicle, the bed having first and second ends and opposing sides, said apparatus comprising:
    a. first and second track members adapted to be mounted on the opposite sides of the bed in a parallel relationship to each other, each of said first and second track members including:
        1. a first elongate runner section extending substantially from the first end of the bed to the second end thereof;
        2. a second elongate runner section in juxtaposition with said first runner section, said second runner section extending substantially from the first end of the bed to a location past the midpoint between the first and second ends of the bed;
        3. said first and second runner sections each having a longitudinal roller slot and roller retaining flange extending the length thereof;
        4. each said roller retaining flange having notches therein in selective locations, said notches being of sufficient size to permit said rollers, set forth below in subparagraph (c) (1), to be removed therethrough;
    b. first and second cover sections each having a length approximately one half that of the bed and a generally inverted U-shaped cross sectional configuration, said second cover section being smaller in height and width than said first cover section whereby it may telescopingly fit within said first cover section;
    c. said first cover section further including roller means affixed on each side thereof and rollably engaged with said slot and roller retaining flange of said second runner sections, said roller means including;
        1. a first pair of rollers on one end of said first cover section, one on each side thereof, and a second pair of rollers on the other end of said first cover section, one on each side;
        2. each roller having an axle extending therethrough, said axle affixed to said second cover section in a substantially horizontal cantilevered fashion;
    d. said second cover section further including roller means affixed on each side thereof and rollably engaged with said slot and roller retaining flange of said first runner sections, said roller means having a configuration exactly like that described above in subparagraphs (c) (1) and (c) (2); and
    e. said notches in said roller retaining flanges being located along said track members in such a relationship to each other that said second pairs of rollers may be selectively aligned therewith to either individually or simultaneously remove or pivot said first and second cover sections through an arc of from 0° to about 90° with respect to the plane of said track members while said first pairs of rollers remain engaged with said slots and roller retaining flanges.

2. The apparatus of claim 1 further including a transverse enclosure member affixed to said track members at the end thereof where said first and second runner sections are coterminous, said enclosure member having sealing means thereon to selectively engage said first cover section.

3. The apparatus of claim 2 wherein said second cover section further includes a hinged tail gate mounted thereon to selectively close the end thereof opposite said transverse enclosure member.

4. The apparatus of claim 3 wherein said hinged tail gate is attached to said second cover section by hinges mounted on the top of said second cover section, and said tail gate is pivotable through an arc of about 270° from its closed position to a rest position substantially parallel to the plane of said track members.

5. The apparatus of claim 4 wherein said tailgate further includes a handle means thereon and said first cover means includes a bracket on the top thereof which is fixedly engaged by said handle means when said first and second cover sections are in telescoping relationship and said tailgate is in the rest position.

6. The apparatus of claim 5 wherein said first runner sections, each having a first latch bolt retaining notch therein near the second end of the bed, and said second cover section includes a locking mechanism comprising:
 a. latch bolts affixed to said second cover section on opposing sides thereof near the end thereof closest to the second end of the bed, said latch bolts beng resiliently urged, by spring means in a downward direction toward engagement with said first latch bolt retaining notches in said first runner sections;
 b. first lever means affixed to said second cover section; and
 c. first connecting means affixed to said first lever means and said latch bolts whereby said lever means may be actuated to move said latch bolts against the urging of said spring means to disengage said latch bolts and said first latch bolt retaining notches.

7. The apparatus of claim 6 wherein said first runner sections each have a second latch bolt retaining notch therein approximately midway between the first and second ends of the bed which may be selectively engaged by said latch bolts when said second cover section is telescoped within said first cover section.

8. The apparatus of claim 7 wherein said second sections each have a third latch bolt retaining notch therein, and said first cover section includes a locking mechanism comprising:
 a. latch bolts affixed to said first cover section on opposing sides thereof, said latch bolts being resiliently urged, by spring means, in a downward direction toward engagement with said third latch bolt retaining notches in said second runner sections
 b. second lever means affixed to said first cover section; and
 second connecting means affixed to said second lever means and said latch bolts whereby said second lever means may be actuated to move said latch bolts against the urging of said spring means to disengage said latch bolts and said third latch bolt retaining notches.

* * * * *